July 28, 1959  E. A. SCHUMACHER  2,896,978

FLANGED PIPE COUPLING HAVING AN EXTERNAL WELDED BAND CLAMP

Filed May 24, 1956

INVENTOR
Ernest A. Schumacher
BY
Julian C. Renfro
ATTORNEY

United States Patent Office 2,896,978
Patented July 28, 1959

2,896,978

FLANGED PIPE COUPLING HAVING AN EXTERNAL WELDED BAND CLAMP

Ernest A. Schumacher, Baltimore County, Md., assignor to The Martin Company, Middle River, Md., a corporation of Maryland Application May 24, 1956, Serial No. 587,095

2 Claims. (Cl. 285—408)

The present invention relates to the coupling of fluid ducts, and more particularly to an improved high-pressure duct coupling assembly and to improved methods or procedures for making such coupling assemblies.

In connection with the design and construction of modern jet aircraft, it is conventional to utilize high-pressure, high-temperature bleed air from the jet engines for auxiliary purposes such as cabin conditioning, anti-icing, and in connection with certain pneumatic systems. Considerable problems have been encountered in the design of such auxiliary systems, since the high temperature and high pressure requirements render such lightweight materials as aluminum generally unsuitable for components of the ducting systems, and require that components such as of steel or titanium be used substantially throughout. In addition, all couplers used in joining the various duct sections together are required to be of the "quick disconnect" type to facilitate rapid replacement and repairs in the field. Heretofore, various coupling devices proposed for use in connection with high-pressure, high-temperature air-duct systems have been costly, bulky, and of substantial weight. Accordingly, the present invention provides a new duct coupling assembly which is substantially lighter in weight and less expensive than arrangements heretofore known, and which is so designed as to simplify and facilitate the design and installation of high-pressure, high-temperature systems.

A duct coupling according to this invention is, in one sense, relatively permanent in nature, and therefore finds its greatest applicability at locations in which the ducting seldom has to be disassembled after the original installation has been completed. However, because the instant coupling can be disconnected very rapidly when desired, it is not limited to applications in which an almost-permanent connection is used.

More specifically, the invention provides a novel arrangement for the coupling together of flanged duct sections wherein the flanged portions of the ducts are placed in abutting engagement and secured together by a plurality of coupling elements received over the flanges and urged radially inwardly thereof in such manner as to press the flanges tightly together. In accordance with the invention, the coupling elements can be carried by a band of steel, titanium or the like which encircles the abutting flanged portions of the ducts. Means are provided for applying and maintaining an external compressing force upon the band and coupling elements so that the ends of the band can be welded together to cause the coupling elements to hold in a highly satisfactory manner, the flanged ends of the duct in abutting relationship. Then when the ends of the encircling band have been welded together the external tightening means are removed, so that the completed coupling assembly will comprises a minimum number of lightweight and compact parts forming an effective and dependable high-pressure joint.

For a better understanding of the invention, reference should be made to the following detailed description and accompanying drawing, in which.

Figure 3:
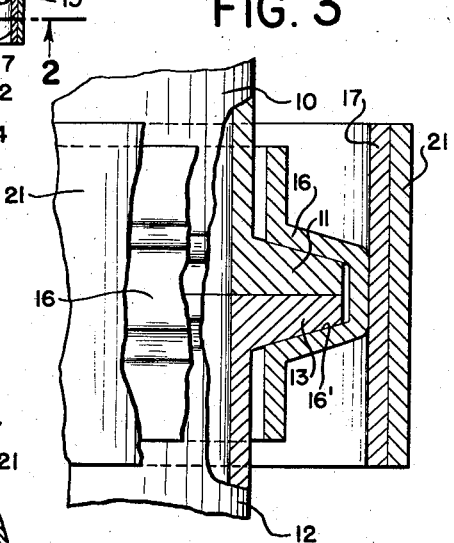
Fig. 3 is an enlarged fragmentary view, with parts broken away, illustrating details of the new coupling assembly.

In the drawings, the numeral 10 designates a first length of tubing or duct, having a flange 11 at its end. The numeral 12 designates a second duct section, having a flange 13 at its end. The duct sections 10, 12 are adapted to be placed in end-to-end relation, with the flanges 11, 13 thereof in abutting engagement, to provide a continuous length of duct. As shown clearly in Fig. 3, the abutting end surfaces of the flanges 11, 13 are accurately machined and close fitting. The non-abutting or inner surfaces of the flanges 11, 13 are of frustro-conical form, lying at a relatively small angle to the flat outer end surfaces of the respective flanges.

In order to retain the flanges 11, 13 in abutting end-to-end engagement, a plurality of arcuate coupling elements 14—16 are provided which engage the flanges 11, 13 about a substantial circumferential portion thereof and act to urge the flanges axially toward each other into tight sealing engagement. The several arcuate coupling elements 14—16 are of similar shape and size and are formed, preferably by stamping or rolling, to define arcuate tapered recesses as indicated at 16' in Fig. 3. In the illustrated form of the invention, the tapered recesses formed within the coupling elements 14—16 are complementary to the exposed end surfaces of the assembled flanges 11, 13. The dimensions of the coupling element recesses may, however, be somewhat smaller than those of the assembled flanges 11, 13, so that when the elements 14—16 are assembled on the flanges, radial clearance is provided between the peripheral surfaces of the flanges 11, 13 and the outer walls of the coupling element recesses.

Figure 2:
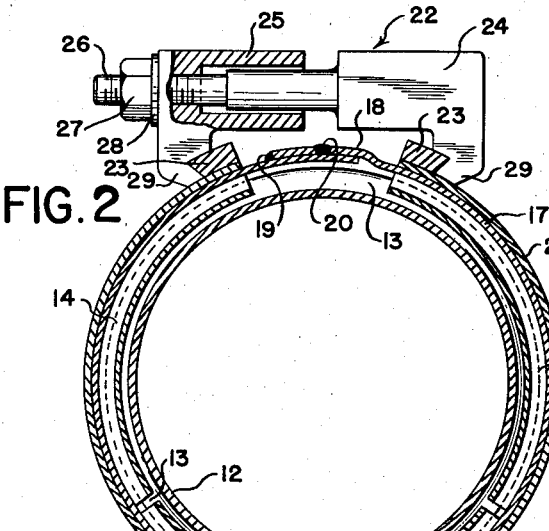
Fig. 2 is a section view taken along line 2—2 of Fig. 1, with parts broken away.
Figures 4, 5:
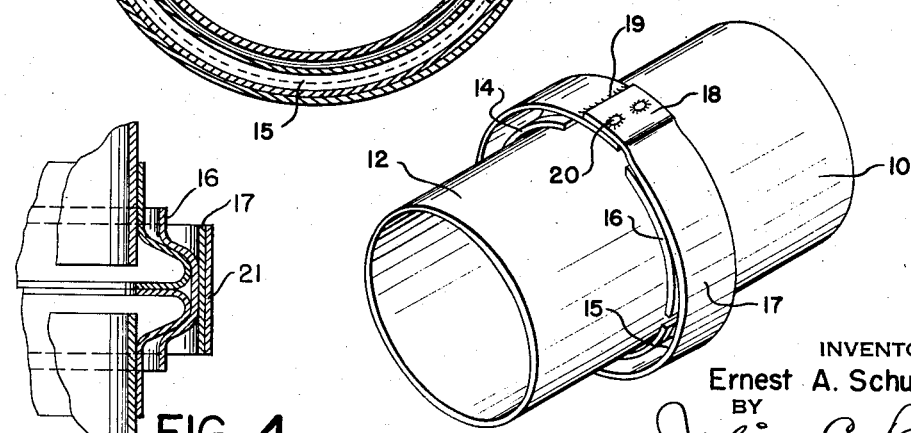
Fig. 4 is a view similar to Fig. 3, showing the present invention being utilized in conjunction with a different type of flange.
Fig. 5 is a perspective view illustrating the completed coupling.

Surrounding the coupling elements 14—16, and preferably spot-welded or otherwise attached thereto, is a tension band 17 of generally circular form. The band 17 is discontinuous in that its end portions are initially not secured together, and the length of the band is such that it may be encircled about coupling elements 14—16 that are positioned upon the flanges 11, 13, and overlap somewhat at its end portions. As indicated in Figs. 2 and 4, the band 17 may be provided with an offset portion 18 at one end so that the end portions of the band may be overlapped without distorting the substantially circular form of the band.

In the preferred and illustrated form of the invention, the coupling elements 14—16 are spaced slightly from each other about the inside of the tension band 17 and are arranged in such manner as to provide a substantial space between the elements 14 and 16, adjacent the ends of the band. However, the coupling elements could be separate from the band 17 if desired.

In accordance with the improved method of the invention, the duct sections 10 and 12 are coupled together in the manner desired by first placing the flanged end portions 11, 13 thereof in abutting engagement. The coupling elements 14—16 and the band 17 are then encircled about the flanges 11, 13 in such manner that the exposed end surfaces of the flanges are engaged and confined against axial separation by the several coupling elements 14—16. In order to press the flanges 11, 13 into tight sealing engagement, the coupling elements 14—16 may be urged radially inwardly so that the tapered side walls of the coupling element recesses press upon the tapered flange surfaces to urge the flanges together. Thus, in completing the coupling assembly, the coupling elements 14—16 and band 17 are compressed radially by the application of external forces, until the desired axial sealing pressure is obtained between the flanges 11, 13. At this time, the overlapped end portions of the tension band 17 are welded together, as at 19 and 20. When the external compressing forces are subsequently relieved, the band 17 will be under circumferential tension and will restrain the coupling elements 14—16 against outward radial movement, so that sealing pressure is maintained upon the flanges 11, 13 in the manner desired.

Figure 1:
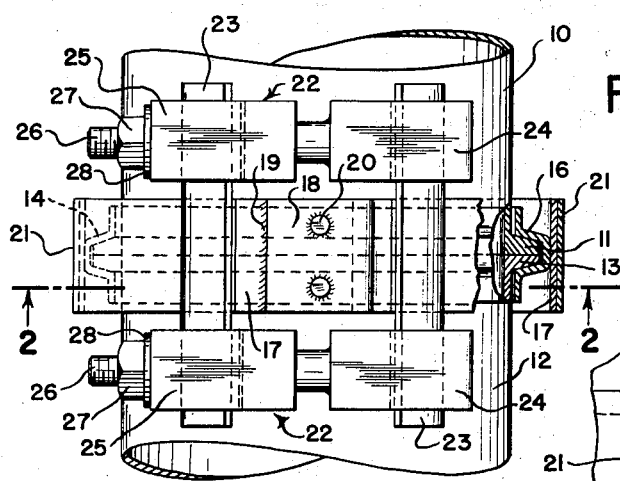
Fig. 1 is a top plan view, with parts broken away, illustrating the duct coupling assembly of the invention.

In order to effect the initial compression of the coupling elements 14—16 upon the flanges, a removable compressing device comprising a band 21 adapted to be encircled about the tension band 17, and a pair of adjustable clamps 22 can be provided. The clamps are adapted to engage the ends of the band 21 to place the same under substantial circumferential tension so that the band 21 presses radially inwardly upon the band 17. As shown in Figs. 1 and 2, the compression band 21 is somewhat shorter in length than the band 17, so that when the compression band 21 is placed about the band 17 a substantial space is provided between the ends of the band 21.

Securely mounted at each end of the compression band 21 is a cleat 23 which extends in an axial direction, and projects outwardly of each side of the band 21. As shown best in Fig. 1, the spaced cleats 23 are adapted to be engaged at their end portions by the spaced clamps 22. The clamps 22 are adjustable, and comprise slidably engaged parts 24, 25. Each of the parts 24 has a stud 26 projecting through the opposite part 25 and engaging a nut and washer assembly 27, 28. By appropriately manipulating the nut 27, the clamp parts 24, 25 may be moved together or separated as may be desired. Each of the clamp parts 24, 25 has a lip 29 adapted to be engaged with a cleat 23 when the compression band 21 is in place about the tension band 17.

When the compression band 21 is put in position, preparatory to completing the coupling assembly, the ends of the compression band are positioned on opposite sides of the overlapped portion of the tension band 17, substantially as indicated in Fig. 2. The clamps 22 are then engaged with the end portions of the cleats 23, so that the clamps are spaced on opposite sides of the bands 17 and 21. The arrangement is such that with the compression band 21 and clamps 22 in position, the overlapped portions of the tension band 17 are exposed and accessible. At this time, the nuts 27 are tightened down on the studs 26 to draw the clamping parts 24, 25 together. This places the compression band 21 under substantial circumferential tension, and causes the tension band 17 and coupling elements 14—16 to be urged radially inward, pressing the flanges 11, 13 tightly together. When the elements 14—16 are under sufficient compression, the overlapped portions of the tension band 17 are welded together. The clamps 22 and compression band 21 are then removed from the assembly, and the coupling elements 14—16 are held in place by the band 17, which is then under circumferential tension.

Preferably the welding of the band 17 involves the use of plug welds at 20, performed through holes drilled in the outer overlapped portion of the band. Then, the free end of the band 17 is welded by a longitudinal weld 19 to make a connection that is highly satisfactory from every standpoint.

The completed duct coupling assembly is shown in Fig. 5, and it will be observed therein that the entire assembly comprises a minimum of lightweight parts. Moreover, the entire assembly is very compact and is confined closely to the outer walls of the duct. The compactness of the assembly is of particular advantage in that design requirements for installation of the duct system are simplified, and there is less difficulty in providing insulation about the duct and coupled joints.

The new coupling assembly satisfies the requirements of a "quick disconnect" coupling in that if field repairs are required the coupling may be removed by merely severing the tension band 17, which immediately releases the joined duct sections. Installation of the new coupling assembly is likewise simple and efficient, and may be accomplished with elementary welding equipment.

An ancillary advantage of the new coupling assembly is that it is uneffected by vibration, for example, and may not be accidentally removed or loosened. Moreover, since removal of the coupler requires destruction of the tension band, the likelihood of unauthorized removal is minimized.

A number of variations in coupling configurations and removable compressing devices is possible within the scope of this invention. For instance, instead of coupling configurations in the nature of those shown in Figs. 1 and 3, flanges of the "upset" type can be employed, as is illustrated at Fig. 4. Also, the external compression device can take the form of a "chain-link" type of tightening tool to be placed over the cleats 23 in the same general manner as illustrated in Fig. 2, so as to extend therebetween. The cleats in such instance will be of approximately the same width as the band 21, and a tightening bolt is threadedly disposed in one end of the link adjacent a cleat, so that by tightening the bolt, the effective length of the link will be shortened so as to draw the cleats toward each other. The open, central portion of the link leaves the overlapped portions of the tension band 17 accessible for the welding operation.

It should be understood that the specific apparatus herein illustrated and described is intended to be representative only, as certain changes may be made therein without departing from the clear teachings of the invention. Accordingly, reference should be made to the following appended claims in determining the full scope of the invention.

I claim:

1. A semi-permanent duct assembly comprising in combination a pair of duct sections aligned in end-to-end relation, each of said duct sections having an outwardly extending flange at one end, coupling means for engaging said flanges to retain said ducts tightly in end-to-end relation comprising at least one arcuate coupling element having a recess therein adapted to be received over said flanges, and a flexible sheet metal band adapted to be encircled about said coupling means, with one end of said band in exposed, overlapping relationship, said coupling means being of less circumference than the circumference of said flanges so as to leave space between the ends of said coupling means, said band being maintained under tension, to hold said coupling means tightly about said flanges, by said exposed end of said band being welded to said band so that the ends of said band are in contact with each other only on their overlapping surfaces, whereby said band can be quickly removed by inserting a cutter in the space between the ends of said coupling means and severing said sheet metal band, thereby providing access to said coupling means and in turn said duct assembly.

2. The semi-permanent duct assembly as in claim 1 in which said sheet metal band is essentially flat, without shoulders at its ends, and said coupling means includes a plurality of arcuate coupling elements disposed in spaced circumferential relation.

(References on following page)

References Cited in the file of this patent

UNITED STATES PATENTS

| | | |
|---|---|---|
| 1,644,553 | Trout | Oct. 4, 1927 |
| 1,737,779 | Stanbrough | Dec. 3, 1929 |
| 1,966,231 | Andrus | July 10, 1934 |
| 2,585,237 | Gay | Feb. 12, 1952 |
| 2,756,079 | Herman | July 24, 1956 |
| 2,761,707 | Herman | Sept. 4, 1956 |

FOREIGN PATENTS

| | | |
|---|---|---|
| 17,432 | Great Britain | July 31, 1911 |
| 498,809 | Belgium | Nov. 14, 1950 |